United States Patent
Sell

(10) Patent No.: US 7,315,301 B1
(45) Date of Patent: Jan. 1, 2008

(54) COMPUTER GRAPHICS PROCESSING SYSTEM, COMPUTER MEMORY, AND METHOD OF USE WITH COMPUTER GRAPHICS PROCESSING SYSTEM UTILIZING HIERARCHICAL IMAGE DEPTH BUFFER

(75) Inventor: John V. Sell, Los Altos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 11/279,981

(22) Filed: Apr. 17, 2006

Related U.S. Application Data

(63) Continuation of application No. 10/090,507, filed on Mar. 4, 2002, now Pat. No. 7,030,877.

(51) Int. Cl.
*G06T 15/00* (2006.01)
(52) U.S. Cl. ...................................... 345/422
(58) Field of Classification Search ...................... None
See application file for complete search history.

(56) References Cited

U.S. PATENT DOCUMENTS

| | | | | |
|---|---|---|---|---|
| 5,027,292 A | * | 6/1991 | Rossignac et al. | 345/422 |
| 5,579,455 A | | 11/1996 | Greene et al. | |
| 5,583,974 A | * | 12/1996 | Winner et al. | 345/422 |
| 5,596,686 A | * | 1/1997 | Duluk, Jr. | 345/422 |
| 5,636,365 A | * | 6/1997 | Tanioka | 711/163 |
| 5,949,423 A | | 9/1999 | Olsen | |
| 6,226,012 B1 | | 5/2001 | Priem et al. | |
| 6,239,808 B1 | | 5/2001 | Kirk et al. | |
| 6,266,064 B1 | | 7/2001 | Snyder | |
| 6,313,839 B1 | * | 11/2001 | Larson | 345/422 |
| 6,480,205 B1 | * | 11/2002 | Greene et al. | 345/631 |
| 6,567,099 B1 | | 5/2003 | Dawson | |
| 6,577,307 B1 | * | 6/2003 | Hsiao et al. | 345/422 |
| 6,636,215 B1 | * | 10/2003 | Greene | 345/422 |

OTHER PUBLICATIONS

Ned Greene, Michael Kass, and Gavin Miller, "Hierarchical Z-Buffer Visibility," Siggraph Conference Proceedings, Aug. 1993, 7 pages.

* cited by examiner

*Primary Examiner*—Ulka Chauhan
*Assistant Examiner*—Peter-Anthony Pappas
(74) *Attorney, Agent, or Firm*—Zagorin O'Brien Graham LLP

(57) ABSTRACT

A computer graphics processing system includes a graphics processor and a computer memory responsive to the graphics processor. The computer memory includes an image depth buffer and a hierarchical image depth buffer. The hierarchical image depth buffer contains data items that identify a nearest depth value and a farthest depth value for a plurality of image depth buffer entries associated with a plurality of corresponding pixels.

20 Claims, 4 Drawing Sheets

COMPUTER GRAPHICS PROCESSING SYSTEM, COMPUTER MEMORY, AND METHOD OF USE WITH COMPUTER GRAPHICS PROCESSING SYSTEM UTILIZING HIERARCHICAL IMAGE DEPTH BUFFER

This application is a continuation of U.S. patent application Ser. No. 10/090,507, filed Mar. 4, 2002, now U.S. Pat. No. 7,030,877, the disclosure of which is hereby incorporated herein by reference in its entirety for all purposes.

BACKGROUND

1. Field of the Invention

The present invention relates generally to graphics processing and methods relating thereto. More particularly, the present invention relates to a computer graphics processing system, computer memory, and related methods that utilize a hierarchical image depth buffer.

2. Description of the Related Art

The process of rendering image data within computer graphics systems is computationally intensive and complex. One significant limitation on the rendering process involves the vast amount of memory bandwidth required due to the volume of data accessed from memory. While there are various segments of memory used during the graphics rendering process, a significant memory bottleneck involves processing data for a memory buffer known as the Z buffer. The Z buffer contains depth values for each of the pixels in a two-dimensional projection of a three-dimensional scene. A particular portion of the rendering process that creates high Z buffer memory traffic is referred to as pixel visibility. This is the process of mapping object data representing various three-dimensional objects to be rendered, to a two-dimensional image to be displayed. The two-dimensional image to be displayed is typically stored in a frame buffer. While rendering the three-dimensional objects, the computer graphics system determines particular pixels for those objects that are visible for a user at a desired viewpoint. For example, one object may be behind another object so that the object furthest from the viewpoint is not visible. The depth data found within the Z buffer is typically used as part of this pixel visibility determination process. However, due to the increasing complexity of scenes and images used in computer graphics applications, such as fast-motion video gaming software, efficient use of Z buffer memory bandwidth has become increasingly important. In certain applications, more memory bandwidth is consumed by Z buffer accesses than any of the other types of memory accesses involved in 3D rendering.

One prior method and system relating to Z buffers and the visibility determination process is described in U.S. Pat. No. 5,949,423 ("the '423 patent"). The method described in the '423 patent identifies a process of sorting certain bounding volumes into an order for testing. While sorting may improve certain aspects relating to depth value usage, sorting also requires significant additional computation time and complexity. Added computation time and complexity is disadvantage in computer graphics methods. It would be desirable to improve Z buffer memory bandwidth efficiency without requiring the added computation and complexity involved using sorting methods. Accordingly, there is a need for an improved graphics processing system and method to perform image rendering with an image depth buffer (Z buffer).

SUMMARY

The present invention relates to a computer graphics processing system, a memory and a method for use in connection with the computer graphics processing system. In one embodiment, the computer graphics processing system includes a graphics processor and a computer memory responsive to the graphics processor. The computer memory includes an image depth buffer and a hierarchical image depth buffer. The hierarchical image depth buffer contains data items that identify a nearest depth value and a farthest depth value for a plurality of image depth buffer entries associated with a plurality of corresponding pixels.

In another embodiment, the computer graphics processing system comprises an image depth buffer; a hierarchical image depth buffer, the hierarchical image depth buffer containing a plurality of entries, each of the plurality of entries associated with a plurality of depth values within the image depth buffer; and a processor having access to the image depth buffer and to the hierarchical image depth buffer. The processor includes a computer graphics routine for use in rendering a portion of an object onto a two-dimensional image plane. The computer graphics routine is programmed to identify a selected pixel corresponding to the portion of the object to be rendered, read an entry from the hierarchical image depth buffer, and to perform a computation with respect to the selected pixel and a set of data items, to make a pixel visibility determination. The entry from the hierarchical image depth buffer contains the set of data items. The set of data items are associated with a plurality of depth values within the image depth buffer. The plurality of depth values are for a set of pixels that includes the selected pixel.

In another embodiment, the method is for use in rendering a portion of an object onto a two-dimensional image plane. The method includes the steps of identifying a selected pixel corresponding to the portion of the object to be rendered, reading data items from a hierarchical image depth buffer, and performing a comparison between the selected pixel and the data items to make a pixel visibility determination. The data items include a near depth value and a far depth value. The hierarchical image depth buffer is associated with a plurality of depth values for a set of pixels where the set of pixels includes the selected pixel.

In another embodiment, the memory includes an image depth buffer containing a plurality of image depth values and a hierarchical image depth buffer. The hierarchical image depth buffer contains a plurality of entries, each of the plurality of entries associated with a set of the plurality of depth values within the image depth buffer. The set of the plurality of depth values within the image depth buffer contains more than one depth value. At least one of the entries of the hierarchical image depth buffer contains a near depth value and a far depth value corresponding to the set of the plurality of depth values.

In another embodiment, the memory includes an image depth buffer including a plurality of image depth values and a hierarchical image depth buffer including a plurality of entries. Each of the hierarchical depth buffer entries is associated with a set of the plurality of depth values within the image depth buffer. At least one of the entries of the hierarchical image depth buffer contains multiple near and far values. Each near and far value corresponds to the set of the plurality of depth values within the image depth buffer or to a subset of the plurality of depth values within the image depth buffer.

In another embodiment, the memory includes an image depth buffer containing a plurality of image depth values and a hierarchical image depth buffer including a plurality of entries. Each of the hierarchical image depth buffer entries is associated with a set of the plurality of depth values within the image depth buffer. Each of the entries of the hierarchical image depth buffer contains two or more pairs of near and far values. Each of the near and far value pairs corresponds to a set or subset of the set of plurality of depth values. Each of the entries of the hierarchical depth buffer contains a description of which members of the associated set of depth values corresponds to each pair of near and far values.

In another embodiment, the memory includes an image depth buffer containing a plurality of image depth values and a hierarchical image depth buffer including a plurality of entries. Each of the hierarchical depth buffer entries is associated with a set of the plurality of depth values within the image depth buffer. Each of the entries of the hierarchical image depth buffer contains one or more pairs of near and far values and one or more near values alone. Each of the entries of the hierarchical depth buffer contains a description of which members of the associated set of depth values corresponds to each pair of near and far values or each near value alone.

In another embodiment, the memory includes an image depth buffer including a plurality of image depth values and a hierarchical image depth buffer including a plurality of entries. Each of the hierarchical depth buffer entries is associated with a set of the plurality of depth values within the image depth buffer. Each of the entries of the hierarchical image depth buffer includes one or more pairs of near and far values and one or more near values alone. Each of the entries of the hierarchical depth buffer includes a description of which members of the associated set of depth values corresponds to each pair of near and far values or each near value alone. Each of the entries of the hierarchical depth buffer includes initialization information for the associated depth buffer entries and for the related pixels.

In another embodiment, the memory includes an image depth buffer including a plurality of image depth values, a first level hierarchical image depth buffer including a plurality of entries and a second level hierarchical image depth buffer including a plurality of entries. Each of the first level hierarchical depth buffer entries is associated with a set of the plurality of depth values within the image depth buffer. Each of the second level hierarchical image depth buffer entries are associated with a set of the plurality of the first level hierarchical image depth buffer entries and the associated image depth buffer values.

BRIEF DESCRIPTION OF THE DRAWINGS

The use of the same reference symbols in different drawings indicates similar or identical items.

DESCRIPTION OF THE DRAWINGS

Figure 1:
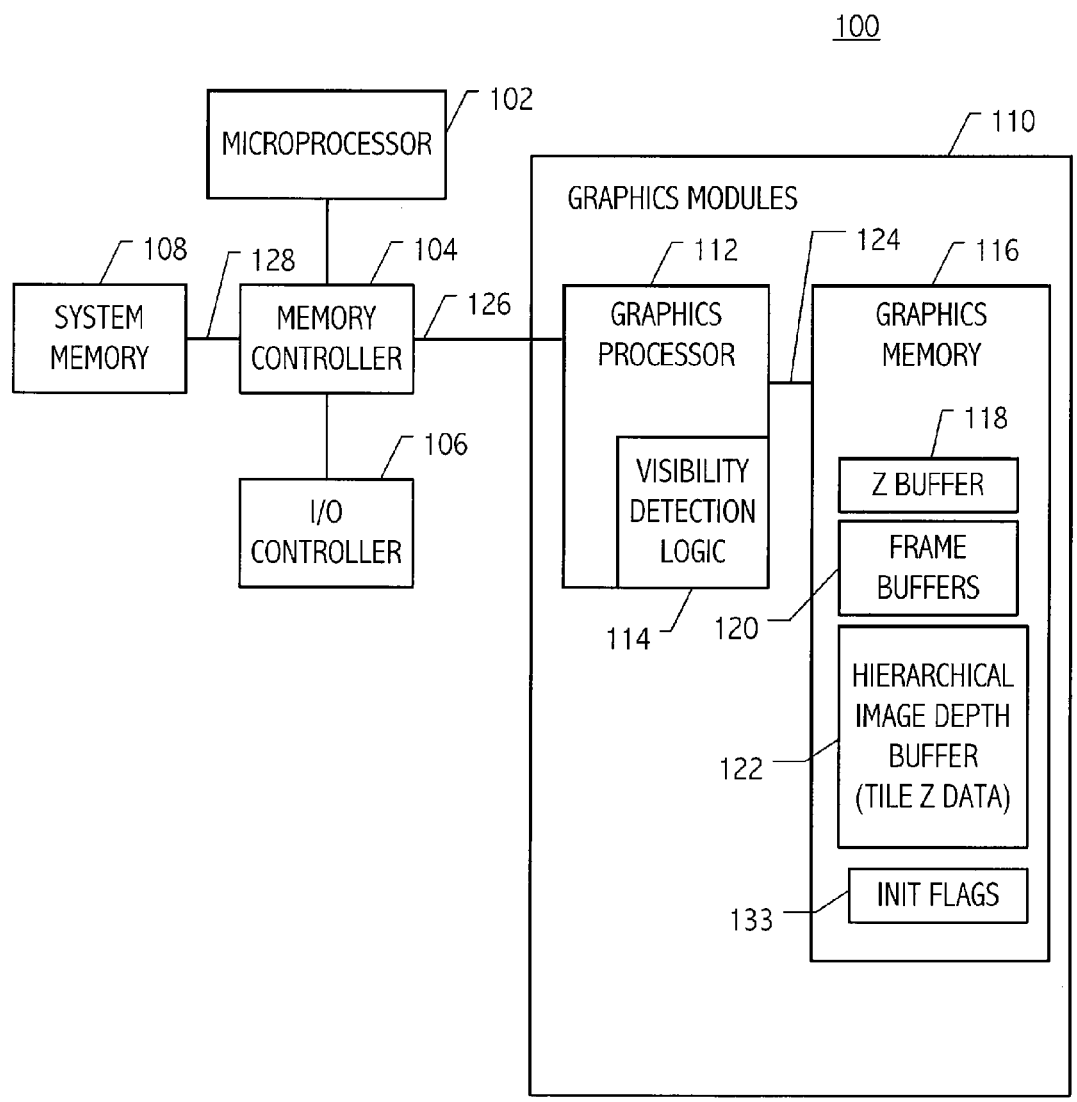
FIG. 1 is a block diagram of a computer graphics processing system that includes a Z buffer and a hierarchical image depth buffer.

Referring to FIG. 1, an illustrative embodiment of a computer graphics processing system is shown. The computer graphics processing system 100 includes a microprocessor 102, a memory controller 104, an input/output controller 106, a system memory 108, and a graphics module 110. The graphics module 110 is coupled to the memory controller 104 via a data bus 126. The microprocessor 102, memory controller 104, input/output controller 106, system memory 108, and memory bus 128 may be implemented using conventional components found within a personal computer.

The graphics module 110 includes a graphics processor 112 and a graphics memory 116. The graphics processor 112 is coupled to the graphics memory via an internal memory bus 124. The graphics processor 112 includes computer logic that may be used to execute a plurality of different software programs. One of the software programs is a visibility detection routine 114. The visibility detection routine 114 may be a hard wired function of the processor 112 or may be stored in embedded memory within the processor 112 or may be retrieved from external memory prior to execution by the processor 112. The graphics memory 116 includes a depth buffer (also referred to as the Z buffer) 118, frame buffers 120, and a hierarchical image depth buffer (also referred to as the TileZ buffer) 122. The graphics processor 112 and the graphics memory 116 may be implemented with standard hardware and software designs found within conventional graphics personal computer cards within a personal computer. But, the visibility detection logic routine 114 and the hierarchical image depth buffer 122 should be implemented based on the description in this specification.

Figure 2:
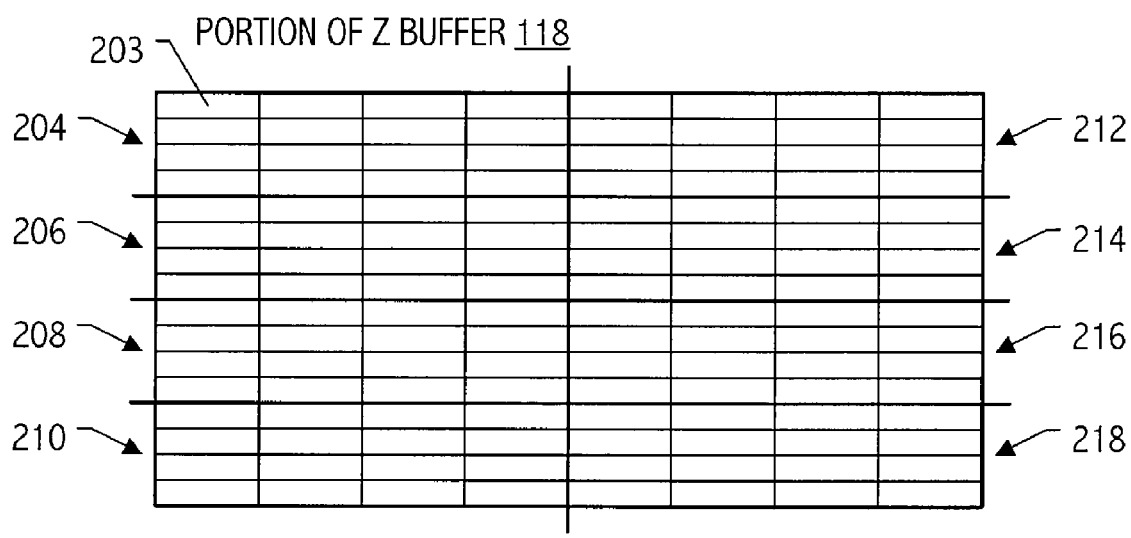
FIG. 2 is a general diagram that illustrates a portion of the Z buffer of FIG. 1 and a portion of the hierarchical image depth buffer of FIG. 1.

Referring to FIG. 2, a portion of Z buffer 118 and a corresponding portion of the hierarchical image depth buffer 122 is shown. The Z buffer 118 includes a plurality of depth values, such as individual depth value 203. Each depth value entry in the Z buffer 118 contains a depth value for a particular pixel in a two-dimensional projection of a three-dimensional scene. The depth value identifies a Z coordinate location for a pixel, assuming an X, Y, Z three-dimensional coordinate system. The Z buffer is subdivided into a plurality of sets of depth value entries. In FIG. 2, sets 204, 206, 208, 210, 212, 214, 216, and 218 are illustrated. Each set includes a plurality of individual depth values. In FIG. 2, each set contains sixteen depth values, illustrated as a 4×4 array. The hierarchical image depth buffer 122 corresponds to the Z buffer 118. A portion of the hierarchical image depth buffer 122 is shown in FIG. 2. The illustrated portion of the hierarchical image depth buffer 122 includes a first entry 220 and a second entry 224. The first entry 220 corresponds to a set within the Z buffer, such as set 204. The second entry 224 corresponds to a different set within the Z buffer 118, such as set 208. Each entry, such as entries 220 and 224, contains a plurality of data items.

For example, the data items may include a near value, a far value, a background near value, background far value, and a plurality of flags. The near values and the far values are for foreground pixels. The near value identifies a depth value for the nearest pixel having a set flag within the corresponding set of the Z buffer 118. The far value identifies a depth value of the pixel having a set flag that is farthest from the view plane within the corresponding set of the Z buffer 118. The background near value identifies the depth value of the nearest pixel within the corresponding set of the Z buffer 118 with a clear flag. The background far value identifies the depth of the farthest pixel within the corresponding set of the Z buffer 118 with a clear flag. In an optional implementation, the background far value is not used to save memory cost, but with reduced processing speed. The flag is a binary flag that is either set or clear. Clear means that a pixel's depth value is less than or equal to the background near value. Set means that the pixel's depth value is between the near and far value. Flags are set as pixels are rendered. Flags are cleared and background near is set to the existing near value when a pixel is rendered into a set of the Z buffer 118 that has all flags set. The data items are used during the pixel visibility determination process. The hierarchical image depth buffer 122 contains significantly less memory space than the Z buffer 118. A significant purpose of using the hierarchical image depth buffer 122 is to reduce the number of Z buffer 122 memory accesses and to thereby reduce Z buffer memory bandwidth during the rendering process.

Figure 3:
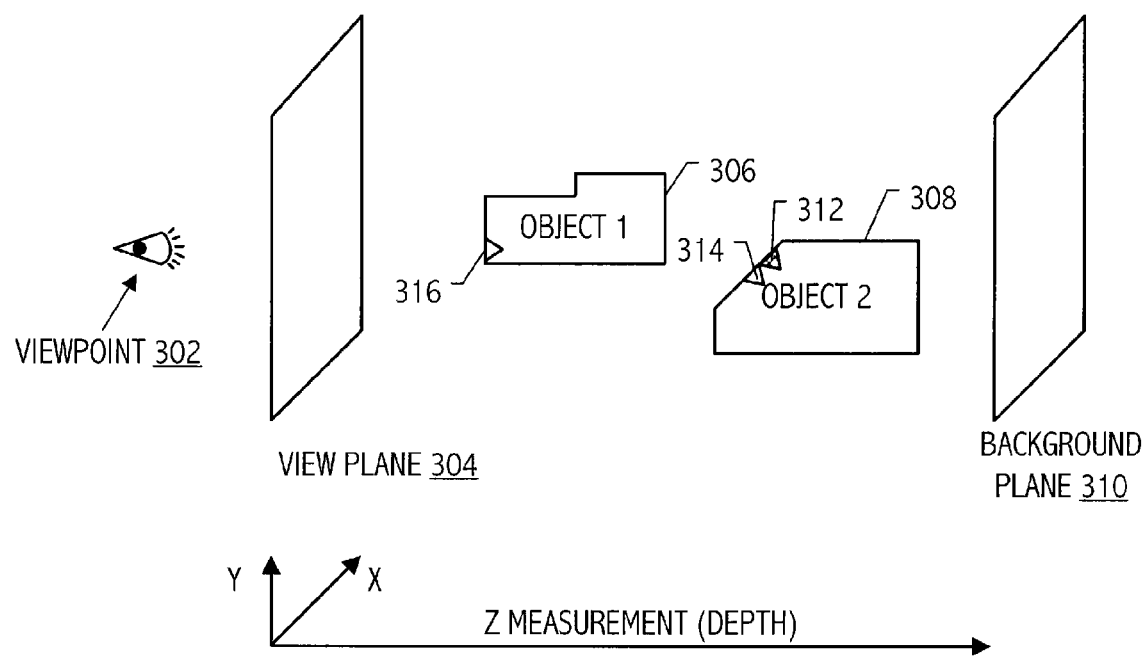
FIG. 3 is a general diagram that illustrates pixel visibility determination during rendering.

Referring to FIG. 3, an illustrative scene containing two different objects is shown. The illustration 300 includes a viewpoint 302, a viewplane 304, a first object 306, a second object 308, and a background plane 310. The illustration also includes a coordinate system that contains a depth (Z) coordinate. The first object 306 contains a first sub-object 316 that is a portion of the first object 306. Similarly, the second object 308 contains sub-objects 312 and 314 that are portions of the second object 308. Each of the sub-objects is triangular in shape. Assuming that a computer graphics application instructed the second object 308 to be rendered, the sub-objects 312 and 314 would be processed by the rendering engine. During a first pass, both the sub-objects 312 and 314 would be rendered onto the image plane. Subsequently, when the first sub-object 316 is rendered, since sub-object 316 (and the pixels within sub-object 316) block sub-object 312 with respect to the viewpoint 302, sub-object 316 would be rendered and sub-object 312 would be occluded. In this case, the rendering engine would determine that each of the pixels forming the sub-object 312 should be overwritten with the pixels from sub-object 316. The illustration of FIG. 3 provides a basis for referencing the pixel-by-pixel determination of visibility or occlusion performed by the visibility determination method handled by visibility detection logic 114. Typical software applications contain more than the two objects illustrated in the simple drawing of FIG. 3, and the many objects in a typical scene may be interwoven and have various complex shapes and sizes.

Applications usually prepare a scene for rendering as a sequence of objects. An object, a person, animal, car, etc., may be a collection of sub objects. However, the components forming a higher level object are usually spatially close if not connected. The components of each object are usually prepared for rendering in sequence.

Higher level objects may be in close proximity to each other or entwined, such as in collisions, or two animated characters interacting closely. However, they are more likely to be spatially separated. The separation may be the horizontal and vertical position as projected onto the view plane, the distance from the viewer, or both.

A higher level object will most likely cover a different part of the view plane then the immediately preceding higher level object in the rendering list. If a scene is being rendered in the order specified by the application then there is high value to caching data related to a typical higher level object, or at least a working set of the object as it's rendered. Caching data related to multiple objects isn't as successful when rendering in application order unless a large part of the scene can be cached.

As illustrated, objects in the direction of and closer to the viewpoint may occlude objects or portions of objects that are further away. Determining visibility because of occlusion is the primary purpose of the Z buffer. It's probable that the portions of objects that cover the same part of the view plane are at distinctly different distances from the viewer. This provides the basis for a hierarchical mechanism that combines depth values for multiple pixels.

The benefits of using a hierarchical image depth buffer increase with greater amounts of occlusion. Typical scenes currently involve 2 to 3 times as many forward facing pixels for all of the objects within the view frustum as there are pixels in the two-dimensional screen space plane. The relative amount of occlusion will trend upward. However, increased rendering performance will be used to improve the quality of objects as well as quantity. Applications will also continue to find it worthwhile to use higher level knowledge of the scene to cull objects that can't possibly be visible. Calculations will be made for 2×, 3×, 4× and 5× ratios of forward facing pixels to screen space.

Figure 4:
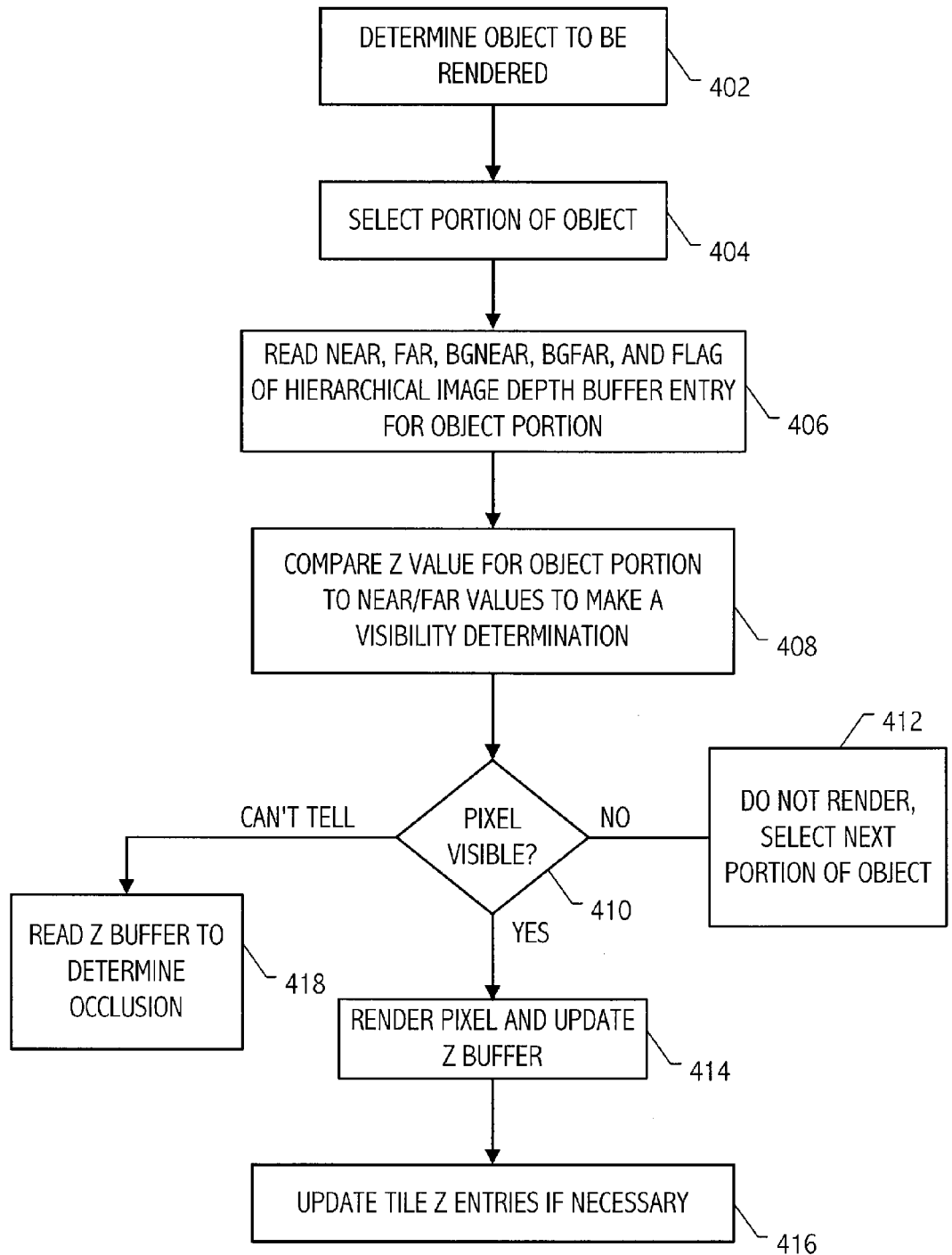
FIG. 4 is a flow chart that illustrates a method that describes pixel visibility determination for use with a computer graphics processing system.

Referring to FIG. 4, an embodiment of a pixel visibility determination method for use with computer graphics rendering is shown. At step 402, an object to be rendered is determined and a portion of the object is selected, at 404. For the selected portion of the object, a corresponding entry is retrieved from the hierarchical image depth buffer. The corresponding entry contains data items including the foreground near and far values, the background near value, the background far value, and the flag value, at step 406. The calculated depth value (Z value) of a selected pixel for the portion of the object is compared to the data items from the hierarchical image depth buffer, such as to the foreground near and far values, the background near value, the background far value, and the flags to make a visibility determination, at step 408. A visibility determination decision is then made at decision step 410. If the pixel is visible based on the visibility determination, then the selected pixel is rendered by writing to the frame buffer and the Z buffer is updated, at 414. The hierarchical image depth buffer is updated as necessary, at 416, a new pixel is selected for rendering, and the process proceeds for the new selected pixel back at step 406.

In a particular implementation, the pixel is visible when the TileZ Flag is clear and Z>=BGNear or when the TileZ Flag is set and Z>=Near. This occurs when the pixel is in front of a previously rendered object.

The 64 byte line containing the pixel is allocated or read into the frame buffer cache if necessary. Existing frame buffer data is needed when blending with the prior value for the pixel. Frame buffer cache entries contain an "all pixels valid" bit. This bit is set if the entry has been read from memory. Frame buffer cache entries contain individual modified bits for each pixel. A modified pixel is implicitly defined as valid.

The Z buffer block associated with the pixel is allocated in the Z buffer cache if necessary. Existing Z buffer data is generally not required if the TileZ check determines that the pixel is rendered. Z buffer cache entries contain an "all valid" bit and individual modified bits similar to the frame buffer cache entries.

The pixel is rendered into the frame buffer cache and its Z value is written into the Z buffer cache.

Most commonly the TileZ Flag is clear. If all flags are clear then near and far are set to the Z value of the pixel being rendered. Otherwise near and far values are updated as necessary. In either case the TileZ Flag is set for the pixel being rendered.

If all TileZ Flags are set then they are cleared except for the flag associated with the pixel being rendered. BGNear is set to the existing near and BGFar is set to the existing far value. Near and far are then set to the Z value of the pixel being rendered.

Least commonly the TileZ Flag for the pixel being rendered is set and one or more of the other flags are clear. This is most likely to occur when the pixel being rendered is just inside the silhouette edge of a previously rendered object, or the current object occludes part of its forward facing self and the pixel being rendered is just inside a silhouette edge of the occluded part. The near value is updated as necessary.

If the selected pixel is not visible, i.e. the pixel is occluded, based on the visibility determination, the pixel is not rendered and is discarded, and the next pixel for a next portion of the object is selected at 412. Processing for the next selected pixel is continued back at step 406.

In an illustrative implementation, the TileZ check determines that the pixel is not rendered when the TileZ Flag is set and Z<Far or if TileZ is clear and Z<BGFAR. This occurs when the pixel is behind a previously rendered object. Texture bandwidth may also be saved if visibility is determined sufficiently early.

In the event that the pixel visibility determination based on the hierarchical image depth buffer is non-deterministic, then the Z buffer is read for the selected pixel to determine visibility or occlusion using the conventional Z buffer method, at step 418. In this case, the TileZ check can't determine visibility or occlusion when the flag is clear and BGFAR<=Z<BGNEAR or the flag is set and Far<=Z<Near. In an implementation without use of BGFAR, the check would be to determine if TileZFlag is clear and Z<BGNEAR.

This usually occurs because the precision of Far, Near or BGNear is less than Z and not sufficient to determine occlusion, or because BGFar is omitted in order to reduce the size of TileZ. The details of TileZ may be refined by testing with a range of applications in order to reduce the number of times when the TileZ check can't determine occlusion.

The Z buffer block associated with the selected pixel is read into the Z buffer cache if necessary. Occlusion is determined in the traditional way by comparing Z with the existing Z buffer value. The pixel is discarded if it isn't rendered and no further action is taken.

If the pixel is rendered then the 64 byte frame buffer line containing the pixel is allocated or read into the frame buffer cache if necessary. As noted previously, existing frame buffer data is needed when blending with the prior value for the pixel. The pixel is rendered into the frame buffer cache and its Z value is written into the Z buffer cache.

There are various possibilities for how to best update the TileZ entry when it was unable to determine occlusion. The least complicated approach is to leave the TileZ entry unchanged. The Z buffer values for the block are in the Z buffer cache and further memory bandwidth will generally not be required to determine occlusion for pixels in the block in the near future.

When a Z buffer cache line is replaced an effort could be made to improve the effectiveness of the associated TileZ entry. A relatively simple step would be to recalculate near and far values from the Z buffer values of pixels with TileZ Flags set and BGNear from the Z buffer values of pixels with TileZ Flags clear without moving pixels between the two groups. However, this may not be worth the trouble, and more complicated optimization is less likely to be worthwhile.

The hierarchical Z algorithm can be applied to any view plane oriented depth buffer. Depth buffers are generally based on the Z or the homogeneous W coordinate of (X, Y, Z, W) points projected to the view plane.

The hierarchical Z algorithm divides the view plane into blocks containing multiple pixels. The most near and most far Z values associated with the pixels in each block are tracked. The near and far values indicate the range of depth values for the pixels in the block. In order to work more efficiently the hierarchical Z algorithm divides the pixels in each block into two groups and maintains depth range information for each group.

There can be two or more hierarchical levels. The first level is a Z buffer containing depth values for each pixel in the view plane. The second level contains depth range information for blocks of pixels. A third level would contain depth range information for super blocks of blocks, and so forth. A two level hierarchy for depth information is suitable in most situations. A detailed example that will be described is a hybrid with a two level hierarchy for depth information and a three level hierarchy for initialization purposes.

It's conceptually easy to determine occlusion with the hierarchical structure in the simple situation where a block is contained within a previously rendered object and also within an object that is being rendered. Most of the time the depth range for the previously rendered object's pixels indicates whether they are behind or in front of the new object's pixels in the block. In some cases the relative depth of the previous and new pixels can't be determined from the near and far values. This can occur when the objects are close together and tilted such that the depth ranges within the block overlap. Indeterminate situations are handled correctly by maintaining the depth values for each pixel in the view plane and using these to determine occlusion when necessary.

The near and far values require much less data than the individual depth values for all of the pixels. Since the near and far values are an imprecise measure of the depth value of any particular pixel, the near and far data can be reduced further by maintaining imprecise near and far values. The near and far values may also be encoded in a variety of ways.

Most memory reading of individual depth values can be eliminated. Writing of depth values associated with pixels that aren't occluded at the time they are rendered still occurs in order to maintain depth information for each pixel in the view plane. However, reading depth values usually represents the majority of the Z buffer memory activity.

There is a major problem with a simple hierarchical structure. Many blocks will be partially inside and outside the silhouette edges of objects or internal edges where an object occludes part of itself. More fundamentally, objects are rendered as a series of triangles or other subset parts. The triangles, or other subset parts, can be in any order and partially cover blocks. Most of the blocks will typically be partially inside and outside of the edges of individual triangles.

Dividing the pixels in each block into a foreground group and a background group solves the problem. Depth range information is maintained for each group and a set of flags indicates which group each pixel belongs to.

More than two objects can have pixels that are visible in the same block. In this case the foreground group consists of the visible pixels in the block that are part of the object or in some cases objects that are closest to the viewpoint. The rest of the pixels are in the background group. They are part of the object or in some cases objects that are furthest from the viewpoint. This situation is infrequent. When it does occur, one or both of the foreground and background depth ranges covers more than one object. This may increase the number of individual depth values that have to be checked in order to determine occlusion. However, the impact is typically negligible for a complete scene.

There is a second set of issues that must be solved in order to achieve the goal of reducing memory bandwidth with a practical implementation. The hierarchical depth ranges should be maintained tightly in order to significantly reduce the number of individual depth values that have to be checked, and the hierarchical algorithm needs to consume a low amount of computation, particularly serially dependent computation.

The hierarchical Z algorithm attempts to strike a compromise between the precision and size of the depth range information. Within this constraint, the depth ranges are maintained as tightly as possible.

The algorithm requires a simple set of magnitude comparisons and individual and all on (or off) flag tests. These determine occlusion directly or that the individual depth value must be checked and provide updated hierarchical data. All of the tests and comparisons can be performed in parallel. Further details are illustrated in the following example.

A reference system is defined as a basis for quantifying the amount of memory bandwidth that the hierarchical Z algorithm can save. The reference system would be a competitive design in terms of memory bandwidth efficiency.

Z buffer, frame buffer, texture, vertex description and rendering list data are accessed in the course of rendering a scene. These are more or less in order from the largest to the smallest in magnitude. In addition, previously rendered data is read for display output.

The graphics engine in the reference system caches Z buffer, frame buffer and texture data internally. Z buffer data is usually read and may subsequently be written by the rendering engine. Frame data is written without being read most of the time; however, it may be read first. Texture data is read, and decompressed if it was compressed. The Z buffer and frame buffer caches have individual modified bits for each pixel so that data can be written and eventually transferred to memory without being read first.

The primary goal of the Z buffer, frame buffer and texture caches are to reduce reading, writing or reading and writing data between cache and main memory more than once in the course of rendering each object. An additional goal is to minimize referencing unnecessary data. The first goal differs from the typical processor code or data cache that anticipates multiple use while data is cached.

When a triangle is rendered the fixed size and alignment of cache lines requires substantial amounts of data surrounding the data associated with the triangle to be read into the caches or to be part of cache lines that are allocated and partially modified. Most of the surrounding data is associated with neighboring triangles that will eventually be rendered as part of the object. Ideally the Z buffer, frame buffer and texture caches are large enough so that the cache lines associated with neighboring triangle data are still present when the neighboring triangles are rendered.

Some of the surrounding data that has to be established in the caches is associated with areas beyond the silhouette edge of the object. This data isn't read or written as the object is rendered, and isn't expected to still be in the caches if it's referenced later.

The amount of unnecessary data that has to be established in the caches can be reduced and the overall efficiency of the caches improved by organizing the data so that cache lines contain data associated with areas that are as square as possible. For example, a 64 byte Z buffer cache line containing sixteen 32 bit depth values can be associated with a 4×4 pixel tile rather than a linear area that is 16 pixels wide by 1 pixel high.

The hierarchical Z algorithm will work with linear or tiled data. The reference system and the hierarchical Z details that will be added to it use 4×4 tiles for 32 bit Z buffer data. Frame buffer data is maintained as a linear sequence of pixels. The format of texture data doesn't affect the reference system or the hierarchical Z details other than assumptions about the relative amount of memory bandwidth required for texture data.

Rendering list and display data are generally read from memory sequentially. The reference system uses buffers sufficient to accommodate latency and access priorities for these types of data.

Vertex description data may be shared by multiple triangles and the various components of the vertex data may be maintained in separate data structures. Example applications providing vertex description data include Microsoft DirectX and OpenGL. The reference system caches vertex data. The vertex data cache is similar to a small code cache. Multiple references to the cached data are typical since a vertex is usually shared by several triangles.

For Z buffer data the "minimum" memory bandwidth in the reference system is defined as reading the data for each forward facing pixel of each object and writing the data for each forward facing pixel that isn't occluded at the time it's rendered. For frame buffer data the "minimum" memory bandwidth in the reference system is defined as writing the data for each forward facing pixel that isn't occluded at the time it's rendered and reading the data for pixels that are written and blended with the previous frame buffer contents. For texture data the "minimum" memory bandwidth in the reference system is defined as reading the texture data required for each forward facing pixel of each object that isn't occluded at the time it's rendered.

For purposes of calculating memory bandwidth requirements it will be assumed that the Z buffer, frame buffer and texture caches are large enough so that an average of 110% of the minimum memory bandwidth is required for these types of data. For Z buffer and frame buffer data the additional 10% represents portions of cache lines beyond the silhouette edges of objects and reading from or writing data to memory more than once per object, less memory bandwidth saved by using data for multiple objects while it's cached. For texture data the additional 10% represents portions of cache lines that are back facing or beyond the silhouette edges of objects and reading data from memory more than once per object, less memory bandwidth saved by using data for multiple objects while it's cached. The rendering pipeline is assumed to be long enough so that texture data can be read after occlusion is determined.

The minimum memory bandwidth requirements for Z buffer, frame buffer and texture data are functions of the amount of data for each pixel, the number of forward facing pixels, and the probability that a pixel is occluded at the time it's rendered. The amount of Z buffer and frame buffer data for each pixel is generally 16 or 32 bits. 32 bits are used in the calculations for both Z buffer and frame buffer data. The amount of texture data for each pixel is influenced by several factors, including compression, levels of detail, number of textures being applied, and multiple use for different parts of an object. An average of 32 bits is used in the calculations.

An average of half of the triangles and half of the pixels are forward facing for fully 3D objects that can be viewed from any direction with equal probability. More than half and possibly all of the triangles and pixels may be forward facing for objects that cannot be viewed from all directions. Fully 3D objects are typically more finely tessellated than view constrained objects. Thus, slightly more than 50% of the triangles and a larger percentage of the pixels in a scene are typically forward facing. The distribution of triangle sizes and direction are important in the design of the graphics engine, however, this information doesn't affect the minimum memory bandwidth requirements for Z buffer, frame buffer and texture data.

The following table lists the average number of pixels that will be rendered for 2×, 3×, 4×, and 5× ratios of forward facing pixels to screen space:

| Forward Facing Pixels | Pixels Rendered |
|---|---|
| 2× | 1.50× |
| 3× | 1.83× |
| 4× | 2.08× |
| 5× | 2.28× |

The calculation of the number of pixels rendered assumes that all sequences of depth ordering are equally probable. Initialization of the frame buffer is excluded. With increasing performance, the amount of static rendering of background scenery via initialization is decreasing. It is also assumed that the pixels are evenly distributed over the view plane. Objects and pixels generally won't be spread uniformly over the view plane. However, the average number of pixels rendered won't change by a great deal unless the distribution is extremely skewed. For example, if an average of 3× forward facing pixels to screen space were comprised of 2× for half of the area and 4× for half of the area, then the average number of pixels rendered would be 1.89× rather than 1.83×.

For purposes of calculating memory bandwidth requirements, it will be assumed that the vertex description data is read once for each object. The vertex description data bandwidth relative to the total size of the vertex description data is a function of the sharing of vertexes between triangles, the degree to which the various types of vertex information are stored separately, and vertex cache inefficiencies.

All of the vertex position data must be read at least once if the graphics engine performs transformation and back face culling. If the vertexes are already transformed the determination of which triangles are forward facing is done by the graphics engine because of the sharing of vertexes. This means that all of the vertex position data is read at least once. Some may be read more than once because of vertex cache inefficiencies. Other vertex information is only needed for forward facing triangles. However, sharing of vertexes between triangles and the degree to which position and other vertex information are stored separately will result in a higher percentage of the other vertex information being read than the percentage of forward facing triangles.

Simulated rendering of typical applications can be used to determine reasonable sizes and organization for the various caches. Something on the order of 16 KB each may be desirable for Z buffer, frame buffer and texture caches in a mid to high performance system. The vertex cache will be much smaller. The memory bandwidth assumptions can be refined with simulations of the reference system with specific caches.

The system in this example is derived from the reference system. A full range of view plane sizes and rendering and refresh rates are supported. A view plane size of 1024×768× 32 bit pixels, and a scene rendering and display refresh rate of 80 Hz are used to quantify the effects of the hierarchical Z algorithm.

Cache and buffer lines are 64 bytes. Memory reads are 64 bytes on 64 byte boundaries. Memory writes are 64 bytes or less within an aligned 64 byte area, but 64 bytes of bandwidth are always used. It is assumed that any combination of aligned 32 bit items can be written within an aligned 64 byte area without reading the existing data first. This saves some frame buffer memory bandwidth with or without hierarchical Z. A similar amount of Z buffer memory bandwidth is saved with hierarchical Z method since the need for most Z buffer reads is eliminated.

There is a two level hierarchy for depth information. The first level is a Z buffer containing depth values for each pixel in the view plane. The Z buffer is 1024×768×32 bits. It is organized as 4×4 tiles. The 16 entries for each tile occupy 64 bytes and are aligned on 64 byte boundaries. The tile organization usually improves the efficiency of the Z buffer cache and reduces the number of memory transactions performed for Z buffer data. The relative effect is similar with or without hierarchical Z, however, tiling is more important without hierarchical Z because there are many more Z buffer data accesses.

The second level consists of a 64 bit hierarchical image depth buffer (TileZ) entry for each set of 16 pixels. TileZ entries contain foreground and background depth range information and flags for a 4×4 tile or "Block" of pixels. There are 49 K Blocks of 16 pixels in a 1024×768 pixel image. The TileZ data is ⅛ as large as the Z buffer, and is a total of 393 KB. TileZ data is cached in the graphics engine. The TileZ cache is much smaller than the Z buffer cache, perhaps as small as the proportionate size of the TileZ data relative to the Z buffer.

The example system uses a three level hierarchy for initialization purposes. The first two levels are the depth information hierarchy. The third level consists of an initialization flag for each 16×8 "Superblock" of 128 pixels, such as the block initialization flags 133 shown in FIG. 1. Thus, a third level hierarchical buffer contains a plurality of initialization flags, each of the initialization flags for a super-block of pixels corresponding to a plurality of the entries within the hierarchical image depth buffer. There are 8 TileZ entries for each Superblock and they occupy 64 bytes. There are 6 K Superblocks and Superblockinit flags for a 1024×768 pixel image. Superblockinit flags are "cached" in a small number of 64 byte buffers in the graphics engine.

The Superblockinit flags are cleared in memory when the Z buffer is initialized to a constant value. This normally happens before each scene is rendered. The Z buffer and TileZ don't need to be cleared. Clearing the Superblockinit flags takes negligible memory bandwidth.

The Superblockinit flags save about 1 B of bandwidth per pixel in the finished image. This is 786 KB or 63 MB per second at 80 Hz for a 1024×768 pixel image. They allow TileZ entries to be initialized in cache as rendering proceeds rather than in memory before rendering each scene. This saves 0.5 B. Another 0.5 B is saved if all TileZ entries would otherwise be read at least once.

Rendering of a typical scene proceeds as follows:
1. Check Superblockinit flag.
   Fetch into Superblockinit buffer if necessary. Each 64 byte line of Superblockinit data represents a 256×256 pixel region, so the optimal number of buffer entries is probably four for even the highest image resolutions.
   If the Superblockinit flag is clear, allocate Superblock entry in the TileZ cache and set the Superblockinit flag. If the Superblockinit flag is set, fetch Superblock entry into TileZ cache if necessary.
2. Check TileZ entry.
   Fetch into TileZ cache if necessary. TileZ entries contain the following:

| | |
|---|---|
| Near | Nearest any pixels with Flags set are in Z, updated as pixels are rendered. |
| Far | Furthest any pixels with Flags set are in Z, updated as pixels are rendered. |
| BGNear | Nearest any pixels with Flags clear are in Z. |
| Flags | Clear means that pixel's Z is <= BGNear. Set means that pixel's Z is between Near and Far. Flags are set as pixels are rendered. Flags are cleared and BGNear is set to existing Near when a pixel will actually be rendered into a Block with all Flags set. |

TileZ entries could also incorporate a BGFar. This would require the resolution of Near, Far and BGNear to be reduced or the size of a TileZ entry to be increased. The most significant situation where BGFar would save bandwidth is when rendering just outside the silhouette edge of an object that is in front of another object that isn't part of the initial background, and the new rendering is behind both objects. Simulations with typical applications may be performed to determine the desired precision of Near, Far and BGNear, and if space should be allocated to a BGFar.

If the Z buffer is initialized to a constant value then TileZ entries are initialized with all flags set and near set to the initial Z value. Far is initialized to an unnatural value that will trigger initialization of the Z buffer values for the Block to a constant with the first rendering into the Block. In the atypical situation where the Z buffer is initialized to varying values, then TileZ entries are initialized at the same time with all flags set and near and far values set appropriately for each block.

When the Z buffer values for a block are initialized to a constant because of the unnatural far value, the block entry should be allocated in the Z buffer cache. The existing memory data is invalid. Encoding whether the Z buffer has been initialized in TileZ and initializing the Z buffer blocks as they are allocated in the Z buffer cache for rendering can usually eliminate all memory bandwidth for Z buffer initialization when the Z buffer is initialized to a constant.

If the frame buffer is also initialized to a constant then the pixels associated with a Z buffer block entry can be allocated and initialized in the frame buffer cache with the first rendering into the block. Since the frame buffer isn't tiled like the Z buffer, four lines are allocated in the frame buffer cache if they aren't already present and ¼ of each line is initialized. When the scene is complete the TileZ entries are checked in order to initialize any frame buffer pixels associated with Z buffer blocks that weren't rendered into. In the example TileZ is ⅛ the size of a 32 bit pixel frame buffer, and there usually will have been rendering into most Z buffer Blocks. Thus close to ⅞ of the memory bandwidth for frame buffer initialization can usually be eliminated when the frame buffer is initialized to a constant.

The frame buffer generally has to be completely initialized because it's normally used later for display or as a texture or image in subsequent rendering. The Z buffer usually isn't used after a scene is completed. Uninitialized Z buffer blocks can be initialized at the same time as the associated frame buffer pixels in the atypical situation where the Z buffer is required later.

The TileZ entries are 64 bits. The Flags occupy 16 bits and Near, Far and BGNear occupy the other 48 bits. The depth information can be encoded in a variety of ways. One that is computationally efficient and should yield good performance is for Near and BGNear to be some number of the most significant bits of the appropriate depth values and the far value to be derived from the near value. For example, near can be 20 bits and BGNear can be 19 bits. Far is 9 bits where 4 bits indicate how many of 0 to 15 most significant bits are the same as near and 5 bits are the next most significant bits. Unnatural values for the far value that can be used to trigger initialization of the Z buffer values for the block to a constant with the first rendering into the block are less than 15 bits the same as the near value and the next 5 bits in are the same.

The number of bits available for depth information is reduced when stenciling is active. If all of the pixels in a block have the same stencil value then one bit could be used to indicate whether the stencil information is equal to an initialization value or to a value in the TileZ entry. Near, Far and BGNear would occupy 47 bits when the stencil values were equal to an initialization value. They would occupy 39 bits when an 8 bit stencil value is stored in the TileZ entry. BGNear can be set closer than the near value as an indication that individual stencil and depth information must be checked when the pixels in the Block don't have the same stencil value.

Where the TileZ check determines that the pixel is not rendered, the TileZ Flag is set and Z<Far. This occurs when the pixel is behind a previously rendered object. The pixel is discarded and no further action is taken. Texture bandwidth may also be saved if visibility is determined sufficiently early.

Where the TileZ check determines that the pixel is rendered, the TileZ Flag is clear and Z>=BGNear or TileZ Flag is set and Z>=Near. This occurs when the pixel is in front of a previously rendered object.

The 64 byte line containing the pixel is allocated or read into the frame buffer cache if necessary. Existing frame buffer data is needed only when blending with the prior value for the pixel. Frame buffer cache entries contain an "all pixels valid" bit. This is set only if the entry has been read from memory. Frame buffer cache entries contain individual modified bits for each pixel. A modified pixel is implicitly defined as valid.

The Z buffer Block associated with the pixel is allocated in the Z buffer cache if necessary. Existing Z buffer data is generally not required if the TileZ check determines that the pixel is rendered. Z buffer cache entries contain an "all valid" bit and individual modified bits similar to the frame buffer cache entries.

The pixel is rendered into the frame buffer cache and its Z value is written into the Z buffer cache.

Most commonly the TileZ Flag is clear. If all Flags are clear then Near and Far are set to the Z value of the pixel being rendered. Otherwise, Near and Far are updated as necessary. In either case, the TileZ Flag is set for the pixel being rendered.

If all TileZ Flags are set then they are cleared except for the Flag associated with the pixel being rendered. BGNear is set to the existing Near. Near and Far are then set to the Z value of the pixel being rendered.

Least commonly, the TileZ Flag for the pixel being rendered is set and one or more of the other Flags are clear. This is most likely to occur when the pixel being rendered is just inside the silhouette edge of a previously rendered object, or the current object occludes part of its forward facing self and the pixel being rendered is just inside a silhouette edge of the occluded part. Near is updated as necessary.

Where the TileZ check cannot determine occlusion, the TileZ Flag is clear and Z<BGNear or the TileZ Flag is set and Far<=Z<Near. This usually occurs because the precision of Far, Near or BGNear is less than Z and not sufficient to determine occlusion, or because BGFar is omitted in order to reduce the size of TileZ.

The Z buffer Block associated with the pixel is read into the Z buffer cache if necessary. Occlusion is determined in the traditional way by comparing Z with the existing Z buffer value. The pixel is discarded if it is not rendered and no further action is taken.

If the pixel is rendered, then the 64 byte frame buffer line containing the pixel is allocated or read into the frame buffer cache if necessary. As noted previously, existing frame buffer data is needed only when blending with the prior value for the pixel. The pixel is rendered into the frame buffer cache and its Z value is written into the Z buffer cache.

There are various possibilities for how to best update the TileZ entry when it was unable to determine occlusion. The least complicated and probably best choice is to leave the TileZ entry unchanged. The Z buffer values for the Block are in the Z buffer cache and further memory bandwidth will generally not be required to determine occlusion for pixels in the Block in the near future.

When a Z buffer cache line is replaced, an effort could be made to improve the effectiveness of the associated TileZ entry. A relatively simple step would be to recalculate Near and Far from the Z buffer values of pixels with TileZ Flags set and BGNear from the Z buffer values of pixels with TileZ Flags clear without moving pixels between the two groups. However, this may not be worth the trouble, and more complicated optimization is less likely to be worthwhile.

The following conditions are used in comparing the memory bandwidth requirements of the reference system and the system in the example. Most of these criteria have been discussed previously.

frame and Z buffers: 1024×768×32 bits
scene rendering and display refresh rate: 80 Hz
forward facing pixels per scene: 2× to 5× the 786 K pixels in the view plane
rendered pixels per scene: 1.50× to 2.28× the 768 K pixels in the view plane
average number of pixels per triangle: 39
forward facing triangles per scene: 40 K to 100 K
totaltriangles per scene: 70 K to 175 K
rendering list data per triangle: 6 B
average data per vertex: 28 B
average number of unique vertexes per triangle: 0.67
average texture data per pixel: 4 B
average amount of blending with existing frame buffer: 0%
(Typically a small percentage of pixels are blended and the same amount of bandwidth would be added to the reference system and systems with hierarchical Z.)

Display refresh memory data bandwidth is 252 MB per second or 3.1 MB per scene.

Rendering list and vertex data memory bandwidths per scene are:

| Forward Facing Pixels | Rendering List | Vertex Data |
| --- | --- | --- |
| 2x | 420 KB | 1.3 MB |
| 3x | 630 KB | 2.0 MB |
| 4x | 840 KB | 2.6 MB |
| 5x | 1.1 MB | 3.3 MB |

Frame buffer rendering and texture memory bandwidths per scene are:

| Forward Facing Pixels | Frame Buffer | Texture |
| --- | --- | --- |
| 2x | 5.2 MB | 5.2 MB |
| 3x | 6.3 MB | 6.3 MB |
| 4x | 7.2 MB | 7.2 MB |
| 5x | 7.9 MB | 7.9 MB |

Z buffer read and write memory bandwidth per scene for the reference system are:

| Forward Facing Pixels | Z Read | Z Write |
| --- | --- | --- |
| 2x | 6.9 MB | 5.2 MB |
| 3x | 10.4 MB | 6.3 MB |
| 4x | 13.8 MB | 7.2 MB |
| 5x | 17.3 MB | 7.9 MB |

Z and frame buffer initialization memory bandwidth per scene for the reference system is 6.3 MB per scene.

With hierarchical Z most Z buffer reading is replaced with TileZ reading and the TileZ data is ⅛ of the Z buffer data. Z buffer read and TileZ memory bandwidth is estimated to be 15% of the reference system Z read memory bandwidth. Z write memory bandwidth remains the same. Under these conditions the Z buffer/TileZ read and Z buffer write memory bandwidth per scene with hierarchical Z are:

| Forward Facing Pixels | Z/TileZ | ZWrite |
| --- | --- | --- |
| 2x | 1.0 MB | 5.2 MB |
| 3x | 1.6 MB | 6.3 MB |
| 4x | 2.1 MB | 7.2 MB |
| 5x | 2.6 MB | 7.9 MB |

Z and frame buffer initialization memory bandwidth per scene with hierarchical Z is typically about 400 KB per scene if the Z and frame buffers are each initialized to a constant value. Most of this bandwidth is used to read the TileZ data to check for any blocks that weren't initialized in the course of rendering.

The total memory bandwidth per scene for the reference system and the system with hierarchical Z are:

| Forward Facing Pixels | Reference | Hierarchical Z |
|---|---|---|
| 2x | 33.6 MB | 21.8 MB |
| 3x | 41.3 MB | 26.6 MB |
| 4x | 48.2 MB | 30.6 MB |
| 5x | 54.8 MB | 34.2 MB |

The hierarchical Z algorithm provides a range within which the depth value of a pixel in the frame buffer lies. The range is usually small and is sufficient to unambiguously determine the visibility of a pixel being rendered most of the time. The precise value is available when necessary so that the hierarchical mechanism does not introduce any changes in the finished results. The hierarchical data is much smaller than the Z buffer and uses much less memory bandwidth.

The hierarchical algorithm includes provisions that maintain its effectiveness at the edges of triangles. In addition, the algorithm eliminates all of the memory bandwidth that could be required to initialize Z buffer data to a constant. It also eliminates most of the memory bandwidth that could be required to initialize frame buffer data to a constant.

The description of particular embodiments in accordance with the invention set forth herein is illustrative, and is not intended to limit the scope of the invention as set forth in the following claims. Variations and modifications of the embodiments disclosed herein, may be made based on the description set forth herein, without departing from the scope and spirit of the invention as set forth in the following claims.

For example, the functions of the software programs referred to in this disclosure may also be performed as a sequence of steps comprising a hardware function of the graphics processor. It is often the case that functions can reasonably be implemented as some kind of software or as what would commonly be thought of as indivisible operations and thus "hardware" functions. There can be execution options and implementation techniques in what appears to be hardware that could allow something to be described as hardware or software. Accordingly, the methods and techniques described may be implemented in hardware, software, or a combination.

What is claimed is:

1. A computer graphics processing system, comprising:
a graphics processor; and
a memory coupled to the graphics processor, the memory including an image depth buffer including a plurality of image depth values and a hierarchical image depth buffer including a plurality of entries, each of the plurality of entries in the hierarchical image depth buffer associated with a respective one of a plurality of sets of image depth values within the image depth buffer, at least one of the entries in the hierarchical image depth buffer containing multiple near depth values and a far depth value, the multiple near depth values and the far depth value being associated with all the image depth values in a particular one of the sets associated with the at least one of the entries.

2. The system of claim 1, wherein one of the near depth values and the far depth value identify a set of foreground pixels associated with a foreground object.

3. The system of claim 2, wherein one of the near depth values identifies a set of background pixels associated with a background object.

4. The system of claim 1, further comprising a third level hierarchical buffer containing a plurality of initialization flags, each of the initialization flags for a super-block of pixels corresponding to a plurality of the entries within the hierarchical image depth buffer.

5. The system of claim 4, wherein the initialization flags are cleared when the image depth buffer is initialized to a constant value.

6. The system of claim 1, wherein at least one of the entries includes multiple near and far depth values, and wherein each of the near and far depth values corresponds to a set or a subset of the plurality of image depth values within the image depth buffer.

7. The system as recited in claim 1, wherein each of the entries includes at least two pairs of near and far depth values that each correspond to a set or a subset of the plurality of image depth values, and wherein each of the entries includes a description of those members of the associated set of the plurality of image depth values corresponding to each of the pairs of near and far depth values.

8. A memory for a computer graphics processing system, the memory comprising:
an image depth buffer including a plurality of image depth values; and
a hierarchical image depth buffer including a plurality of entries, each of the plurality of entries associated with a set of image depth values within the image depth buffer, at least one of the entries including multiple near and far depth values, and wherein each of the near and far depth values are associated with all of the image depth values in the set.

9. The memory of claim 8, wherein one of the near depth values and one of the far depth values identify a set of foreground pixels associated with a foreground object.

10. The memory of claim 8, wherein one of the near depth values identifies a set of background pixels associated with a background object.

11. The memory of claim 8, further comprising a third level hierarchical buffer containing a plurality of initialization flags, each of the initialization flags for a super-block of pixels corresponding to a plurality of the entries within the hierarchical image depth buffer.

12. The memory of claim 11, wherein the initialization flags are cleared when the image depth buffer is initialized to a constant value.

13. The memory as recited in claim 8, wherein each of the entries includes at least two pairs of near and far depth values that each correspond to a set or a subset of the plurality of image depth values, and wherein each of the entries includes a description of those members of the associated set of the plurality of image depth values corresponding to each of the pairs of near and far depth values.

14. A computer graphics processing system, comprising:
a graphics processor; and
a memory coupled to the graphics processor, the memory including an image depth buffer including a plurality of image depth values and a hierarchical image depth buffer including a plurality of entries, each of the entries in the hierarchical image depth buffer associated with a different set of image depth values within the image depth buffer, each of the entries including at least two near and at least one far depth value, each of the entries including a plurality of flags, each of the flags indicating a relationship of a corresponding one of the image depth values in the set to one or more of the near and far depth values.

15. The system of claim 14, wherein each entry includes at least two pairs of near and far depth values and a first pair of the at least two pairs of near and far depth values identifies a set of foreground pixels associated with a foreground object.

16. The system of claim 15, wherein a second pair of the at least two pairs of near and far depth value identifies a set of background pixels associated with a background object.

17. The system of claim 14, further comprising a third level hierarchical buffer containing a plurality of initialization flags, each of the initialization flags for a super-block of pixels corresponding to a plurality of the entries within the hierarchical image depth buffer.

18. The system of claim 17, wherein the initialization flags are cleared when the image depth buffer is initialized to a constant value.

19. The system of claim 14, wherein each entry includes at least two pairs of near and far depth values and the pairs correspond to a set or a subset of the plurality of image depth values within the image depth buffer.

20. The system as recited in claim 14, wherein a size of the hierarchical image depth buffer is less than one-fourth the size of the image depth buffer.

* * * * *